(12) United States Patent
Watkins et al.

(10) Patent No.: US 7,099,984 B2
(45) Date of Patent: Aug. 29, 2006

(54) METHOD AND SYSTEM FOR HANDLING INTERRUPTS AND OTHER COMMUNICATIONS IN THE PRESENCE OF MULTIPLE PROCESSING SETS

(75) Inventors: John E. Watkins, Sunnyvale, CA (US); Paul J. Garnett, Camberley (GB); Stephen Rowlinson, Reading (GB)

(73) Assignee: Sun Microsystems, Inc., Santa Clara, CA (US)

( * ) Notice: Subject to any disclaimer, the term of this patent is extended or adjusted under 35 U.S.C. 154(b) by 522 days.

(21) Appl. No.: 10/389,443

(22) Filed: Mar. 14, 2003

(65) Prior Publication Data

US 2003/0182492 A1    Sep. 25, 2003

(30) Foreign Application Priority Data

Mar. 19, 2002  (GB) ................... 0206453.3

(51) Int. Cl.
*G06F 13/00*  (2006.01)
(52) U.S. Cl. ....................... 710/306; 710/260
(58) Field of Classification Search ............ 710/316, 710/317, 309, 240–244, 260, 306
See application file for complete search history.

(56) References Cited

U.S. PATENT DOCUMENTS

| | | | |
|---|---|---|---|
| 5,276,899 A | | 1/1994 | Neches |
| 5,408,671 A | * | 4/1995 | Tanaka ................ 709/214 |
| 5,790,776 A | | 8/1998 | Sonnier et al. |
| 5,838,894 A | | 11/1998 | Horst |
| 5,915,082 A | * | 6/1999 | Marshall et al. .......... 714/11 |
| 5,953,742 A | | 9/1999 | Williams |
| 6,151,689 A | | 11/2000 | Garcia et al. |
| 6,167,477 A | | 12/2000 | Garnett et al. |
| 6,233,702 B1 | | 5/2001 | Horst et al. |
| 6,260,159 B1 | | 7/2001 | Garnett et al. |
| 6,289,022 B1 | | 9/2001 | Gale et al. |
| 6,496,940 B1 | | 12/2002 | Horst et al. |
| 6,622,219 B1 | | 9/2003 | Tremblay et al. |
| 6,629,195 B1 | * | 9/2003 | Schroeder et al. .......... 711/108 |
| 6,640,287 B1 | | 10/2003 | Gharachorloo et al. |
| 6,662,253 B1 | * | 12/2003 | Gary et al. ............. 710/244 |
| 6,718,474 B1 | * | 4/2004 | Somers et al. .......... 713/322 |
| 6,772,241 B1 | * | 8/2004 | George et al. ............ 710/36 |
| 6,782,453 B1 | | 8/2004 | Keltcher et al. |
| 6,785,763 B1 | | 8/2004 | Garnett et al. |

(Continued)

OTHER PUBLICATIONS

The I2C Bus Specification, Version 2.1, Jan. 2000, pp. 1-46.*

(Continued)

*Primary Examiner*—Paul R. Myers
*Assistant Examiner*—Trisha Vu
(74) *Attorney, Agent, or Firm*—Meyertons Hood Kivlin Kowert & Goetzel, P.C.

(57) ABSTRACT

A computing system comprises two or more processing sets, for example for fault tolerant operation. The multiple processing sets have a connection to at least one device, typically many devices. The ownership of each device is allocated to one of the two or more processing sets. When an interrupt is generated within a device, this is transmitted from the device to the processing set to which ownership of the device has been allocated, but not to the remaining processing sets. In addition, a command for a device may be generated by a processing set. However, receipt of this command by the device is disabled if the processing set that generated the command has not been allocated ownership of the device.

28 Claims, 10 Drawing Sheets

U.S. PATENT DOCUMENTS

| | | |
|---|---|---|
| 6,785,777 B1 | 8/2004 | Garnett et al. |
| 6,920,519 B1 * | 7/2005 | Beukema et al. ............ 710/306 |
| 2002/0065986 A1 | 5/2002 | Garnett et al. |
| 2002/0065996 A1 | 5/2002 | Garnett et al. |
| 2002/0066049 A1 | 5/2002 | Garnett et al. |
| 2003/0182594 A1 | 9/2003 | Watkins et al. |

OTHER PUBLICATIONS

International search report application No. GB0206453.3 mailed Oct. 30, 2002.

* cited by examiner

METHOD AND SYSTEM FOR HANDLING INTERRUPTS AND OTHER COMMUNICATIONS IN THE PRESENCE OF MULTIPLE PROCESSING SETS

FIELD OF THE INVENTION

The present invention relates to a computer system including multiple processing sets and at least one device, and in particular to communications between these components.

BACKGROUND OF THE INVENTION

In many computer applications, it is very important to be able to provide a high degree of reliability. A known way of achieving this is to use a fault tolerant computer, such as taught in U.S. Pat. No. 6,167,477 (referred to hereinafter as the '477 patent). The system described in the '477 patent has two (or more) processing sets that can be configured to perform identical operations. The processing sets are joined by a bridge (sometimes known as a voting bridge), which in turn is linked to a bus. Various input/output devices are then attached to the bus (e.g. disk storage, network communications, etc.).

The design philosophy of this fault tolerant system is to try and prevent any error that might occur within one of the processing sets from propagating into the outside world, in other words from the bridge onto the bus, and from there to the various external devices. In order to achieve this, the output from the processing sets is compared at the bridge. Any discrepancy between the outputs from the different processing sets is detected and serves as an indication of potential error.

At this point, the system generally tries to make a determination as to which of the processing sets is responsible for the error. There are various techniques for doing this. For example if one processing set is trying to perform an illegal operation, such as writing to a non-existent address on the bus, it is assumed that this is the processing set that is malfunctioning. Alternatively, in systems having more than two processing sets, it can be sensible to go with the verdict of the majority of the processing sets. In more complicated situations, the bridge can ask the processing sets to run various diagnostic tests on themselves, in order to try and pinpoint the source of the error.

Assuming that a determination of the malfunctioning processing set can indeed be successfully made, then the system can continue in operation by using only the processing set(s) that is (are) behaving correctly, with the output from the other processing set being ignored.

The system in the '477 patent also supports a split mode, in which the two or more processing sets can be operated independently. Such a mode is particularly useful after an error has been detected, in order to allow a faulty system to be properly investigated, repaired, and then brought up-to-date. Another possible reason for adopting split mode is to increase system throughput, since the processing sets are now no longer duplicating each other's work, but can now both perform useful (separate) calculations.

In the system taught by the '477 patent, in split mode each of the various devices attached to the bus is formally allocated to one or other of the processing sets. This ownership information is maintained in a set of registers within the bridge. Accordingly, in a programmed I/O operation a processing set can only read from or write to a device that it has ownership of. Likewise, a given device can only perform DMA (direct memory access) for memory belonging to its assigned processing set.

This approach helps to ensure proper independence between the processing sets in split mode, so that the operations of one processing set do not impact the operations of the other processing set(s). This is particularly important given the main reason for going to split mode is after the detection of an error, indicating a potential malfunction in one of the processing sets.

However, the implementation of split mode in known systems has not generally achieved full independence between the different processing sets. One reason for this is that interrupts from the devices have generally been transmitted as out-of-band events via a special-purpose chip, bypassing the bridge and therefore the device ownership information. Consequently, each interrupt is transmitted to all of the processing sets, irrespective of which particular processing set actually owns the device from which the interrupt originated. Accordingly, each processing set has to investigate the source of all incoming interrupts. Thus if the source of an interrupt corresponds to a device that the processing set owns, then that processing set is responsible for servicing the interrupt; if not, then the interrupt can be discarded. It will be appreciated that as a result of this configuration, a processing set must process all interrupts, at least initially, rather than just those from associated devices, and this can have a negative impact on overall system performance.

A potentially more serious problem is that known systems also support a maintenance bus, which is typically used for controlling various physical operating parameters of a device in the system, such as fan speed for cooling purposes, and power supply regulation. Device ownership by the various processing sets is not enforced on the maintenance bus. As a result, it is potentially feasible for one processing set to switch (power) off a device supposedly belonging to another processing set. It will be appreciated that this would not be a desirable occurrence, and could lead to error, or at least the unexpected inability of a processing set to continue operations.

SUMMARY OF THE INVENTION

In accordance with one embodiment of the invention there is provided a method of operating a computing system. The computer system comprises two or more processing sets, each having a connection to at least one device (typically multiple devices) capable of raising an interrupt. Ownership of each device is allocated to one of the processing sets. When an interrupt is generated within a device, this is transmitted from the device to the processing set to which ownership of the device has been allocated (but not to the other processing sets).

In this manner, the operation of the various processing sets can continue independently of one another, in that they only have to deal with interrupts of direct concern to them (in that they own the originating device). They do not receive or have to process interrupts from devices that they do not own, and hence would not be of interest to them.

A processing set typically comprises one or more processors, potentially with ancillary components such as memory, and may represent what would be regarded as an individual computer within a cluster or distributed grouping of such computers. Each device typically comprises facilities to be shared between the processing sets, such as an interface card to mass storage (e.g. a disk drive array) or to an external network, such as Ethernet. Note that the allocation of a device to a processing set is generally performed by the processing sets themselves, but could also be performed by any other suitable mechanism. The computing system itself typically comprises some form of server configuration, but may instead represent any other appropriate form of computer installation. This may of course potentially lie outside the mainstream computing environment, for example representing a networked installation of intelligent home entertainment devices.

In one embodiment, a bridge is provided within the computing system intermediate the two or more processing sets and the device(s). Interrupts are transmitted from a device to a processing via the bridge. In particular, an interrupt is first sent from the originating device to the bridge, which then forwards the interrupt to the particular processing set to which ownership of the originating device has been allocated. The bridge maintains information specifying ownership of a device by a processing set, in other words, which processing set owns which device. This information is then utilised in order to forward an interrupt to the correct owning processing set. Note that this ownership information is typically also used for other purposes by the bridge, for example to ensure that processing sets only read to and write from devices that they own.

In one particular embodiment, the computing system is operable in two different modes. In a first combined mode, the processing sets operate in lockstep with one another, while in a second split mode, the processing sets operate independently of one another. It is only in split mode that interrupts are transmitted solely to the processing set to which ownership of the device has been allocated; in combined mode they are transmitted to all of the processing sets.

In another embodiment of the invention there is provided a computing system including two or more processing sets, and a device capable of raising an interrupt. This device has a connection to each of the processing sets over which an interrupt can be transmitted. Ownership of the device is allocated to one of the multiple processing sets. The computing system further includes a control facility associated with the connection for steering an interrupt from a device just to the processing set to which ownership of the device has been allocated.

In one particular embodiment, the control facility comprises a bridge located intermediate the processing sets and the device(s). In this case, the interrupt is transmitted over the connection from the device to the processing set to which ownership of the device has been allocated via the bridge. The bridge includes memory such as a register or random access memory (RAM) for storing information specifying ownership of a device by a processing set. An interrupt received at the bridge from the device is then steered to a processing set in accordance with the stored information. Of course, the device ownership information could also be stored elsewhere (for example at the processing sets), and then retrieved by the bridge in order to perform this routing.

Another embodiment of the invention provides a computing system comprising two or more processing sets and one or more devices. Each device is capable of raising an interrupt and has a connection to each of the two or more processing sets. The computing system further comprises means for allocating ownership of a device to one of the two or more processing sets; means for generating an interrupt within the device; and means for transmitting this interrupt from the device only to the processing set to which ownership of the device has been allocated (rather than to all processing sets).

In accordance with another embodiment of the invention, there is provided a method of operating a computing system comprising two or more processing sets that each have a serial connection to a device. The method includes the steps of allocating ownership of the device to one of the processing sets; generating a command for transmission to a device by a processing set; and disabling transmission of the command to the device over the serial connection if the processing set that generated the command has not been allocated ownership of the device.

Thus processing sets are prevented from affecting or interfering with a device (or devices) that they do not own. Thus if in error they try to send a command to such a device that they do not own, the system is operative to prevent this command being received by the ineligible device. Consequently, proper independence is maintained between the processing sets, since they can only control devices that they themselves own. It will be appreciated that the disabling can be performed either by only enabling correctly targeted commands, or by disabling incorrectly targeted commands (or both).

Again, a processing set typically comprises one or more processors, potentially with ancillary components such as memory, and may represent what would be regarded as an individual computer within a cluster or distributed grouping of such computers. The device(s) typically comprise(s) a facility to be shared between the processing sets, such as an interface card to mass storage (e.g. a disk drive array) or to an external network, such as Ethernet. The allocation of a device to a processing set is generally performed by the processing sets themselves, but could also be performed by any other suitable mechanism.

In one embodiment a bridge is provided within the computing system intermediate the processing sets and the device(s). A command from a processing set to a device is transmitted via the bridge. More especially, the command is first transmitted from a processing set to the bridge, which then forwards it to a device over the serial connection. However, this forwarding is disabled if the processing set that generated the command has not been allocated ownership of the device.

This is supported by the bridge maintaining information specifying ownership of a device by a processing set, so that the disabling can be performed in accordance with this information. In particular, the disabling typically involves comparing the information maintained at the bridge specifying ownership of the device with information specifying the processing set that transmitted the command to the bridge, and enabling the forwarding of the command from the bridge to the device only if this comparison reveals a match. This can be done by sending an enablement signal in the event of a match, and/or a disablement signal if there is no match.

In accordance with another embodiment of the invention there is provided a computing system comprising two or more processing sets and at least one device having a serial connection to each of the processing sets for receiving commands therefrom. The ownership of a device is allocated to one of the processing sets. The system further comprises a control facility associated with the serial connection for disabling transmission of a command to a device if the processing set that generated the command has not been allocated ownership of the device.

Typically this control facility comprises a bridge located intermediate the processing sets and the device(s), so that a command is transmitted from a processing set to the bridge for forwarding to a device via the bridge and over the serial connection. This forwarding of a command from the bridge over the serial connection to the device is disabled if the processing set that generated the command has not been allocated ownership of the device. This can be determined from information, which can be stored within the bridge, specifying ownership of a device by a processing set. In one embodiment this determination is performed by logic within a disablement unit. This compares the information stored at the bridge specifying ownership of the device with information specifying the processing set that transmitted the command to the bridge, and outputs an enablement signal in the event that this comparison produces a match.

Again, the computing system is operable in two different modes, a first combined mode in which all of the processing sets operate in lockstep with one another, and a second split mode in which the processing sets operate independently of one another. The system is arranged so that the disabling of transmission of a command to a device on the basis of device ownership is only enforced if the computing system is in split mode. This is because in lockstep mode, the concept of device ownership by a particular processing set is largely irrelevant, since all the processing sets are supposed to be operating in conjunction with one another (rather than independently).

In one particular embodiment, the bridge includes a multiplexer. Each output of the multiplexer is attached to a serial connection to a respective device. The bridge further includes a controller responsive to an address received in a command from a processing set for selecting the multiplexer output in accordance with the device to which the command is directed. Note that the disablement unit is also responsive to this address received in a command from a processing set in order to check that the command is being sent from the processing set that owns the target device.

In one particular embodiment, the serial connection (which can typically be an I2C or USB connection) is used for transmitting maintenance commands between the processing sets and the device(s). A separate bus connection is then provided between the processing sets and the device(s) for transmitting commands other than maintenance commands. The control facility is also associated with this separate bus connection, thereby allowing device ownership information stored within the control facility to be used to direct and regulate commands transmitted over both the serial connection and also this separate bus connection.

In accordance with another embodiment of the invention there is provided a computing system comprising two or more processing sets, and a device having a serial connection to the each of the processing sets for receiving commands therefrom. The computing system further comprises means for allocating ownership of the device to one of the processing sets; means within a processing set for generating a command for transmission to the device; and means for disabling transmission of the command to the device over the serial connection if the processing set that generated the command has not been allocated ownership of the device.

BRIEF DESCRIPTION OF THE DRAWINGS

Particular embodiments of the present invention will now be described in detail, by way of example only, with reference to the accompanying drawings in which like reference signs relate to like elements and in which.

DETAILED DESCRIPTION

Figure 1:
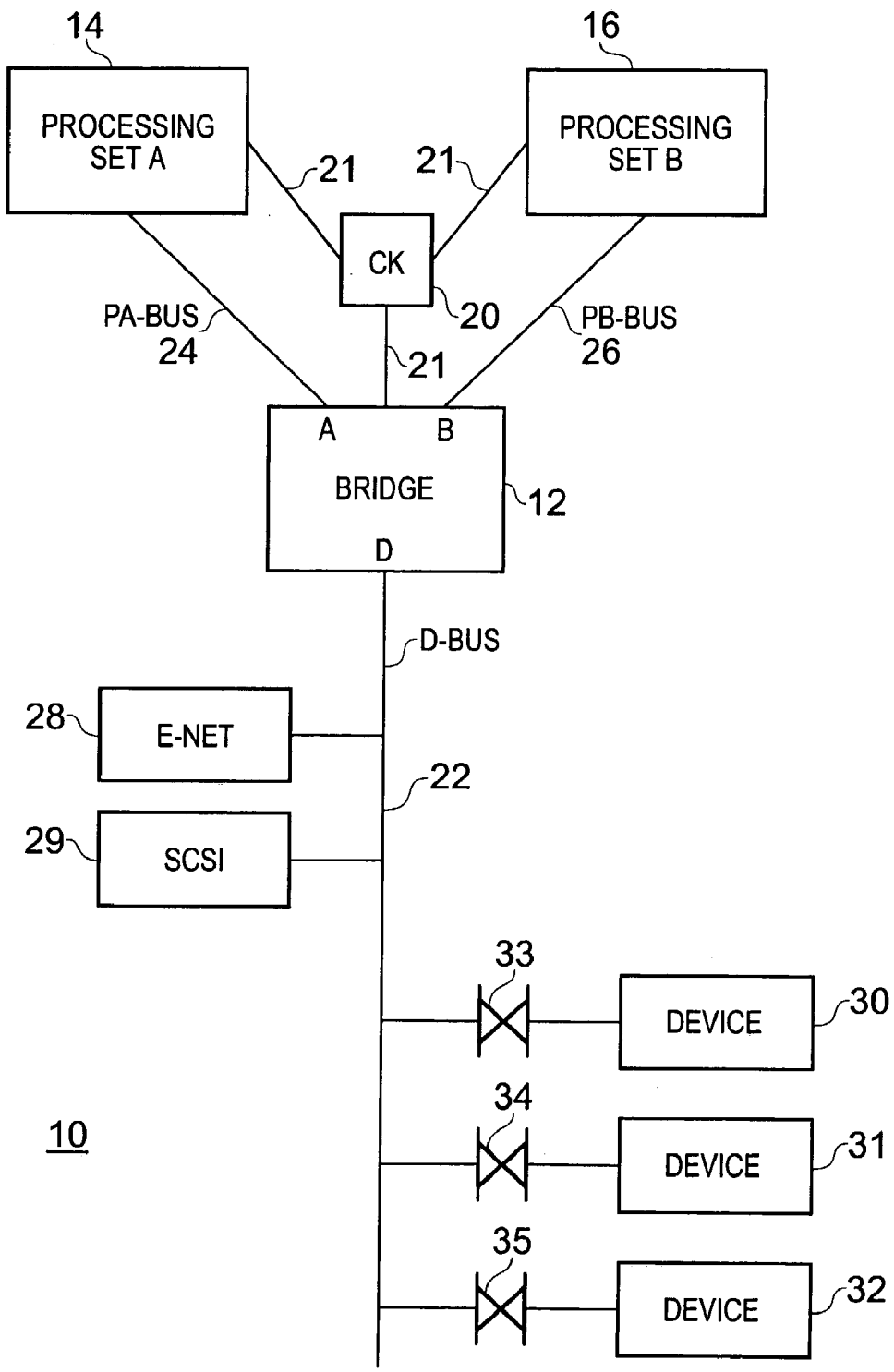
FIG. 1 is a schematic overview of a fault tolerant computer system, such as disclosed in the '477 patent.

FIG. 1 is a schematic overview of a fault tolerant computing system 10 as disclosed in the '477 patent, comprising a plurality of CPU sets (processing sets) 14 and 16 and a bridge 12. As shown in FIG. 1, there are two processing sets 14 and 16, although in other embodiments there may be three or more processing sets. The bridge 12 forms an interface between the processing sets and I/O devices such as devices 28, 29, 30, 31 and 32. The processing sets 14 and 16 and the bridge 12 are operable in synchronism under the control of a common clock 20, which is connected thereto by clock signal lines 21.

Note that the term "processing set" is used to denote a group of one or more processors, possibly including memory, which output and receive common outputs and inputs. It should be noted that the alternative term, "CPU set", could be used instead. In addition, the term "bridge" is used to denote any device, apparatus or arrangement suitable for interconnecting two or more buses or other communications links of the same or different types (and may also include further functionality, as hereinafter discussed).

The first processing set 14 is connected to the bridge 12 via a first processing set I/O bus (PA bus) 24, in one embodiment a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, in one embodiment also a PCI bus. It will be appreciated that although the buses 22, 24 and 26 are all PCI buses in the embodiment shown in FIG. 1, this is merely by way of example, and in other embodiments other bus protocols may be used. In addition, the D-bus 22 may have a different protocol from that of the PA bus 24 and the PB bus 26.

In the embodiment illustrated, some of the devices, including an Ethernet (E-NET) interface 28 and a Small Computer System Interface (SCSI) interface 29, are permanently connected to the device bus 22, but other I/O devices, such as I/O devices 30, 31 and 32, can be hot insertable into individual switched slots 33, 34 and 35. Dynamic field effect transistor (FET) switching can be provided for the slots 33, 34 and 35 to enable hot insertability of the devices such as devices 30, 31 and 32. The provision of the FETs enables an increase in the length of the D bus 22 as only those devices that are active are switched on, reducing the effective total bus length. It will be appreciated that the number of I/O devices that may be connected to the D bus 22 and the number of slots provided for them can be adjusted according to a particular implementation in accordance with specific design requirements. Note that as illustrated in the '477 patent, computer 100 may include multiple bridges, to provide redundancy and/or to allow usage of a greater number of devices.

The bridge 12 is operable in a number of operating modes, of which the three most important are a combined (fault tolerant) mode, an error mode, and a split mode. In combined mode, bridge 12 is operable to route addresses and data between the processing sets 14 and 16 (via the PA and PB buses 24 and 26, respectively) and the devices (via the D bus 22). In this combined mode, I/O cycles generated by the processing sets 14 and 16 are compared to ensure that both processing sets are operating correctly. Comparison failures force the bridge 12 into an error-limiting mode (EState) in which device I/O is prevented and diagnostic information is collected. Finally, in the split mode, the bridge 12 routes and arbitrates addresses and data from one of the processing sets 14 and 16 onto the D bus 22 and/or to the other one of the processing sets. In this mode of operation, the processing sets 14 and 16 are not synchronized and no I/O comparisons are made. DMA operations are permitted in both modes.

Figure 2:
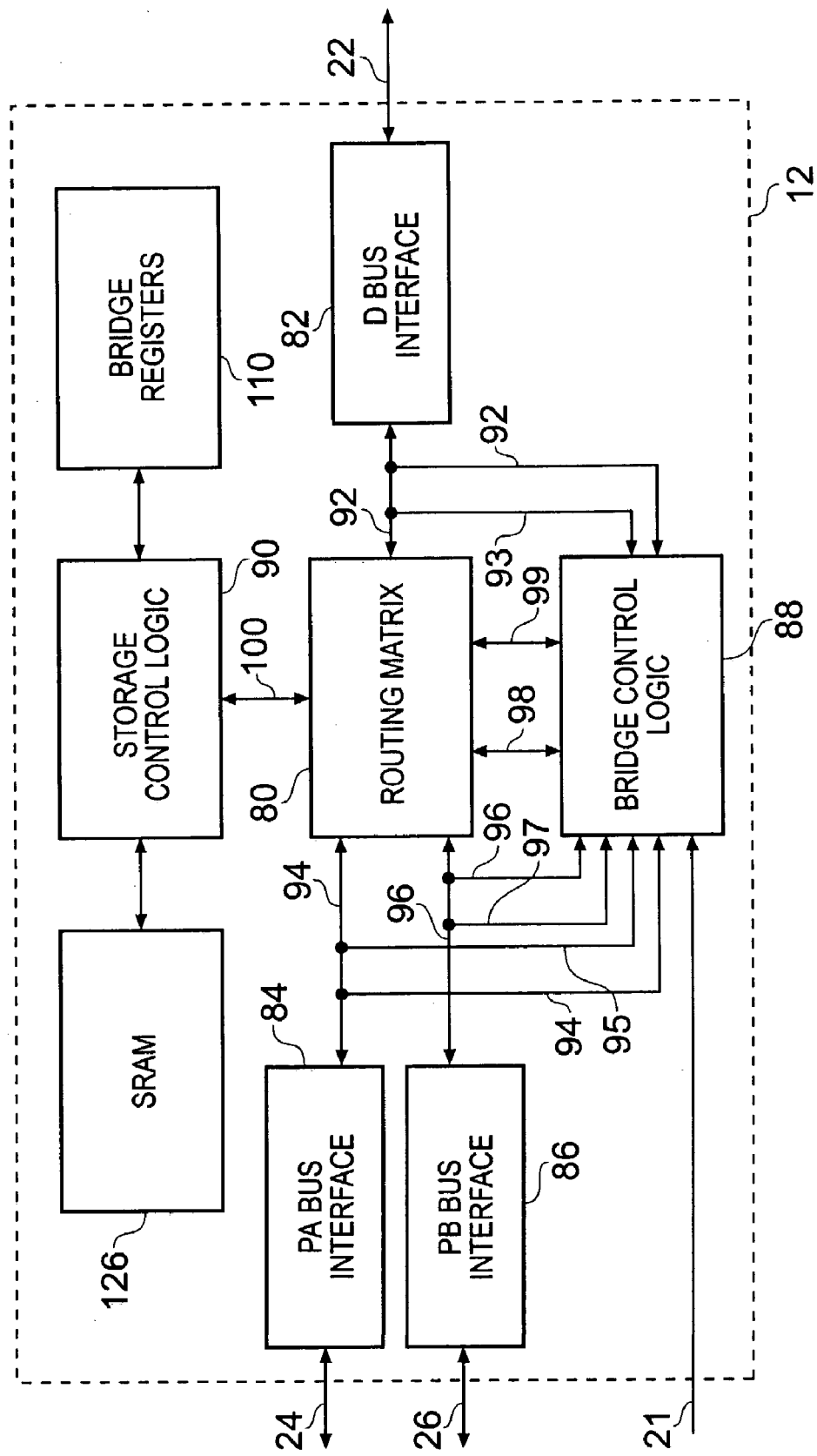
FIG. 2 is a schematic block diagram of an embodiment of a bridge for the system of FIG. 1.

FIG. 2 is a schematic functional overview of the bridge 12 of FIG. 1. First and second processing set I/O bus interfaces, PA bus interface 84 and PB bus interface 86, are connected to the PA and PB buses 24 and 26, respectively. A device I/O bus interface, D bus interface 82, is connected to the D bus 22. It should be noted that the PA, PB and D bus interfaces need not be configured as separate elements but could be incorporated in other elements of the bridge.

A routing matrix 80 is connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide I/O bus transaction routing in both directions between the PA and PB bus interfaces 84 and 86. It is also able to provide routing in both directions between one or both of the PA and PB bus interfaces and the D bus interface 82.

The routing matrix 80 is connected via a further internal path 100 to storage control logic 90. The storage control logic 90 controls access to bridge registers 110 and to a random access memory (SRAM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In one embodiment of the invention, each of the P buses (PA bus 24 and PB bus 26) operates under a PCI protocol, and the processing set bus controllers also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an I/O error.

The device bus interface 82 performs all the functionality required for a PCI compliant master and slave interface for transferring data to and from one of the PA and PB buses 84 and 86. The D bus 82 is operable during DMA transfers to provide diagnostic information to internal status registers in the storage subsystem 90 of the bridge on transition to an EState or on detection of an I/O error.

Figure 3:
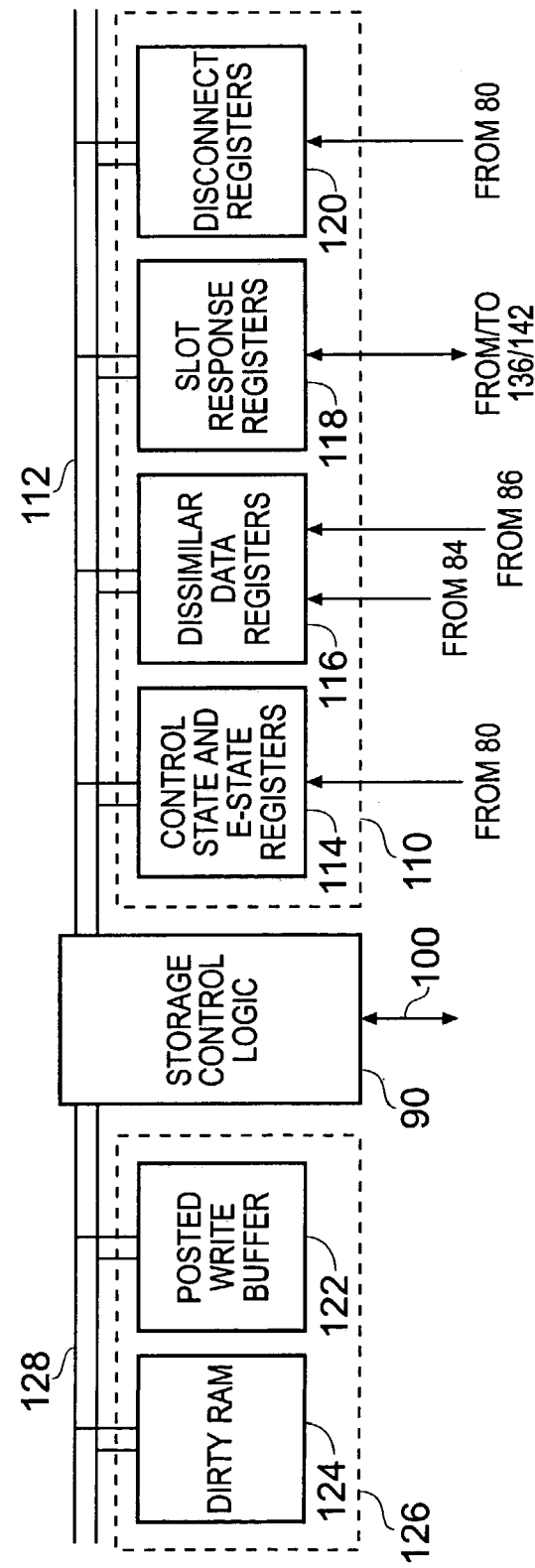
FIG. 3 is a schematic block diagram of storage for the bridge of FIG. 2.

FIG. 3 illustrates in more detail the bridge registers 110 and the SRAM 126. The storage control logic 90 is connected via a path (e.g. a bus) 112 to a number of register components 114, 116, 118, 120. The storage control logic is also connected via a path (e.g. a bus) 128 to the SRAM 126, in which a posted write buffer component 122 and a dirty RAM component 124 are mapped. Although FIG. 3 illustrates a particular configuration, whereby the posted write buffer 122 and the dirty RAM 124 are mapped to different regions of the SRAM memory 126, with registers 114, 116, 118 and 120 then being separate from the SRAM memory, it will be appreciated that these components may be configured in other ways. For example, the various components may all be defined as regions of a common memory (e.g. a random access memory such as the SRAM 126, with the path 112/128 being formed by internal addressing of the regions of memory).

Control and status registers (CSRs) 114 form internal registers that help to control various operating modes of the bridge. For example, they allow the capture of diagnostic information for an EState and for I/O errors, and they control processing set access to PCI slots and devices connected to the D bus 22. These registers are set by signals from the routing matrix 80. Dissimilar data registers (DDRs) 116 provide locations for containing dissimilar data for different processing sets to enable non-deterministic data events to be handled. These registers are set by signals from the PA and PB buses. Slot response registers (SRRs) 118 determine ownership of device slots on the D bus 22, and allow DMA operations to be routed to the appropriate processing set(s). These registers are linked to address decode logic. Disconnect registers 120 are used for the storage of data phases of an I/O cycle that is aborted while data is in the bridge on the way to another bus. Note that although shown separately in FIG. 3, the DDRs 116, the SRRs 118 and the disconnect registers may form an integral part of the CSRs 114.

A dirty RAM 124 is used to indicate those pages of the main memory of the processing sets 14 and 16 that have been modified by direct memory access (DMA) transactions from one or more devices on the D bus 22. Each page (e.g. each 8K page) is marked by a single bit in the dirty RAM 124, which is set when a DMA write occurs. This can then be cleared by a read and clear cycle initiated on the dirty RAM 124 by a processing set 14 or 16. The dirty RAM 124 and the posted write buffer 122 may both be mapped into the memory 126 in the bridge 12. This memory space can be accessed during normal read and write cycles for testing purposes.

Note that all of the devices connected to the D bus 22 are addressed geographically. Thus, for example, slot 0 on motherboard A has the same address when referred to by processing set 14 or by processing set 16. Accordingly, the bridge 12 carries out decoding in order to enable the isolating FETs for each slot before an access to those slots is initiated.

The address decoding is performed by address decode logic 136 and 138 within the bridge control logic (see FIG. 4), and permits four basic access types:

a PCI configuration access to devices in I/O slots;

an out-of-sync access (i.e. not in the combined mode) by one processing set to the other processing set (e.g. from processing set 14 to processing set 16 of FIG. 1). In this case the access is routed from the PA bus interface 84 to the PB bus interface 86;

an access by one of the processing sets 14 and 16 in split mode, or both processing sets 14 and 16 in combined mode, to an I/O device on the D bus 22. In this case the access is routed via the D bus interface 82; and a DMA access by a device on the D bus 22 to one or both of the processing sets 14 and 16. This would be directed to both processing sets 14 and 16 in the combined mode; to the relevant processing set 14 or 16 if out-of-sync; and to the processing set 14 or 16 that owns the slot in which the device is located in split mode.

The SRRs 118 are also associated with the address decode functions. In the split mode, each slot can be in one of three states. The states are: not owned (unowned); owned by processing set A 14; and owned by processing set B 16. A slot that is not owned by the processing set making a particular access (whether because it is not owned at all, or because it is owned by the other processing set) cannot be accessed by that processing set. Accordingly, such an access is aborted.

When a processing set 14 or 16 is powered off, all slots owned by it move to the unowned state. A processing set 14 or 16 can only claim an unowned slot—it cannot wrest ownership away from another processing set. Transfer of slot ownership can only be done by powering off the other (owning) processing set, or by getting the other processing set to relinquish ownership.

Note that the ownership bits in the SRRs 188 are assessable and settable while in the combined mode, but have no effect until a split state is entered. This allows the configuration of a split system to be determined while still in the combined mode.

Each PCI device is allocated an area of the processing set address map. The top bits of the address are determined by the PCI slot. Where a device carries out DMA, the bridge is able to check that the device is using the correct address because a D bus arbiter informs the bridge as to which device is using the bus at a particular time. If a device accesses a processing set address that is not valid for it, then the device access will be ignored.

The addresses output by the address decoders are passed via the initiator and target controllers 138 and 140 to the routing matrix 80 via the lines 98 under control of a bridge controller 132 and an arbiter 134. Arbiter 134 is operable in various different modes to arbitrate for use of the bridge on a first-come-first-served basis using conventional PCI bus signals on the P and D buses. In split mode, both processing sets 14 and 16 must arbitrate the use of the bridge, and thus access to the device bus 22 and internal bridge registers (e.g. CSR registers 114). The bridge 12 must also contend with initiators on the device bus 22 for use of that device bus 22.

Figure 4:
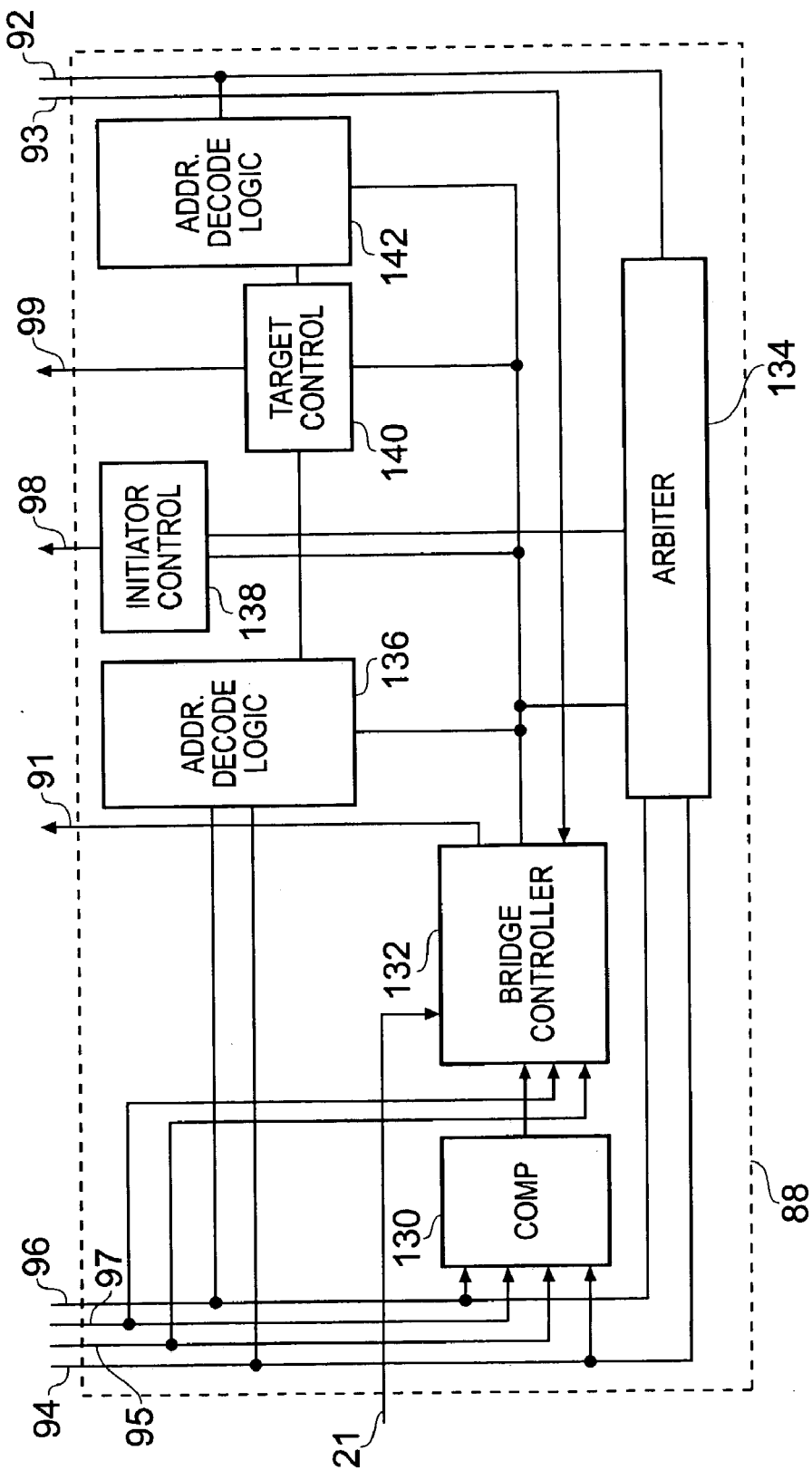
FIG. 4 is a schematic block diagram of control logic for the bridge of FIG. 2.

Also shown in FIG. 4 is a comparator 130. The comparator 130 is operable to compare I/O cycles from the processing sets 14 and 16 to determine any out-of-sync events when the system is in combined mode. The determination of an out-of-sync event by the comparator 130 causes the bridge controller 132 to activate an Estate, thereby prompting analysis of the out-of-sync event and potential recovery therefrom.

Figure 5:
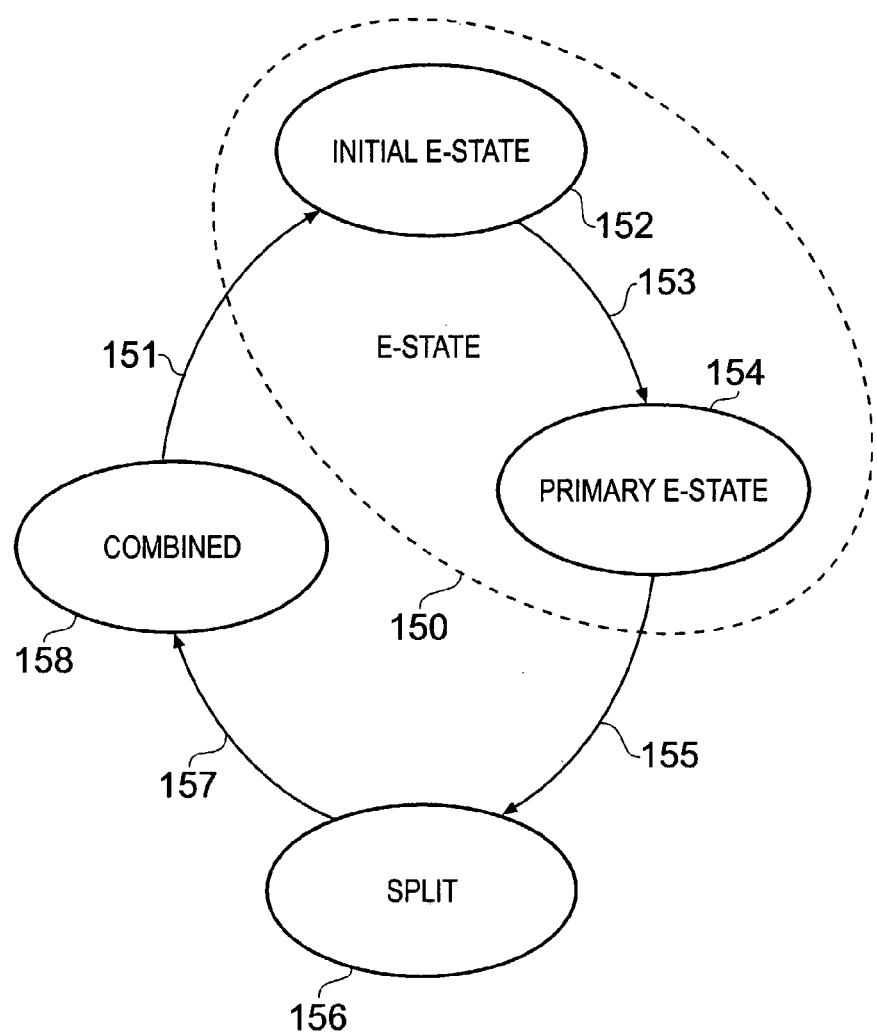
FIG. 5 is a state diagram illustrating operational states of the bridge of FIG. 2.

FIG. 5 is a transition diagram illustrating in more detail the various operating modes of the bridge. The bridge operation can be divided into three basic modes, namely an error state (EState) mode 150, a split state mode 156 and a combined state mode 158. The EState mode 150 can be further divided into 2 states, an initial EState 152 and a primary EState 154. Note that the various states described are controlled by the bridge controller 132.

After initial resetting on powering up the bridge, or following an out-of sync event, the bridge is in the initial EState 152. When either processing set 14/16 has become the primary processing set, (following determination of the correctly operating processing set 153), the bridge then operates in the primary EState 154. This state allows the primary processing set to write to bridge registers (specifically the SRRs 118).

Once the EState condition is removed, the bridge then moves (155) to the split state 156. In the split state 156, access to the device bus 22 is controlled by the SR registers 118, while access to bridge storage is simply arbitrated. The primary status of processing set 14 or 16 is ignored.

Transition to a combined operation is achieved by means of a sync_reset (157). After issue of the sync_reset operation, the bridge is then operable in the combined state 158, in which all read and write accesses on the D bus 22 and the PA and PB buses 24 and 26 are (potentially) allowed. To ensure fault tolerance, all such accesses on the PA and PB buses 24 and 26 are compared in the comparator 130. Detection of a mismatch between any read and write cycles (except those permitted by the DDRs) then causes a transition 151 back to the EState 150.

As previously discussed, each of the slots on the device bus 22 has a slot response register (SRR) 118 that contains bits defining the ownership of the slots (and the devices connected to the slots on the D-bus). In this embodiment, and for reasons to be elaborated below, each SRR 118 comprises a four-bit register. However, it will be appreciated that a larger register will generally be required to record ownership between more than two processing sets; for example, if three processing sets are provided, then a five bit register would typically be utilised for each slot.

Figure 6:
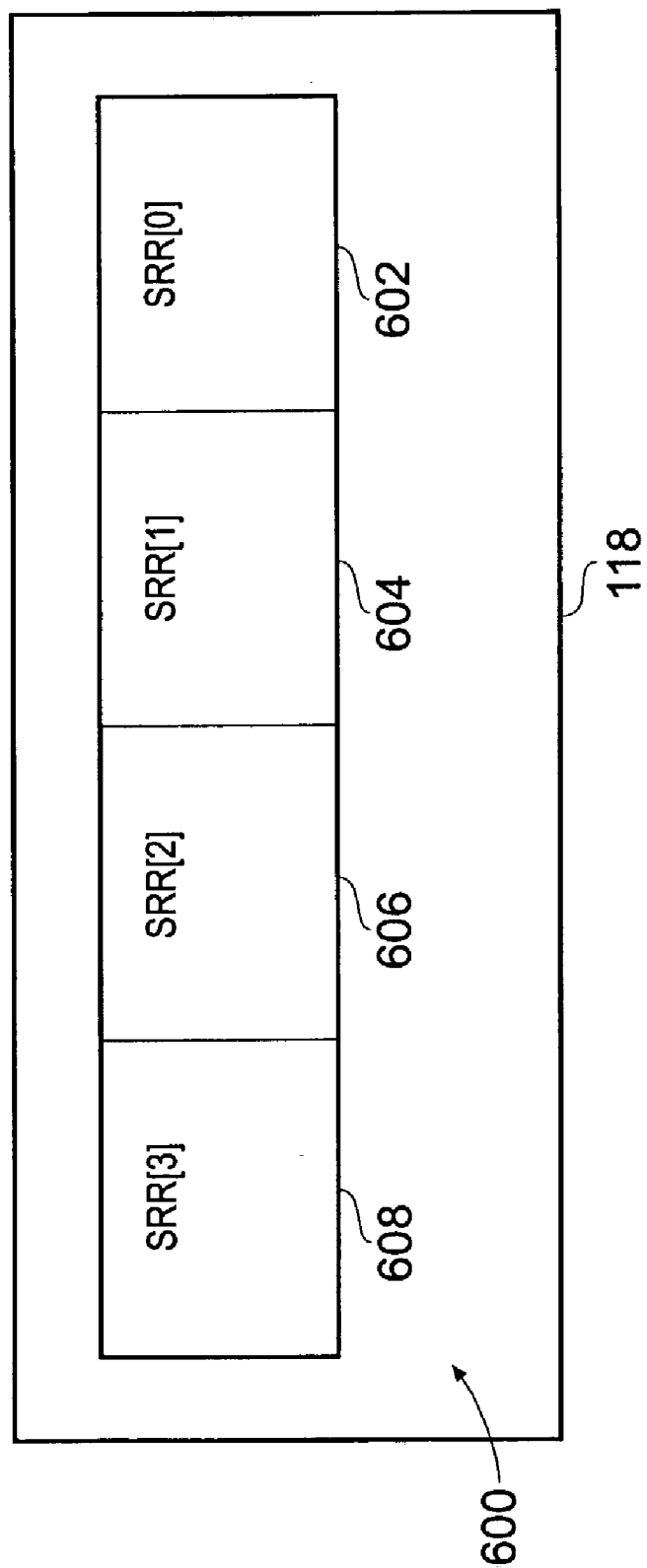
FIG. 6 is a schematic representation of a slot response register in the bridge of FIG. 2.

FIG. 6 illustrates schematically one such four-bit register 600. As shown in FIG. 6, a first bit 602 is identified as SRR[0], a second bit 604 is identified as SRR[1], a third bit 606 is identified as SRR[2], and a fourth bit 608 is identified as SRR[3]. Bit SRR[0] is set when writes for valid transactions are to be suppressed. Bit SRR[1] is set when the device slot is owned by the first processing set 14. This defines the access route between the first processing set 14 and the device slot. When this bit is set, the first processing set 14 can always be master of a device slot 22, while the ability of the device slot itself to be master depends on whether bit SRR[3] is set. Bit SRR[2] is set when the device slot is owned by the second processing set 16. This defines the access route between the second processing set 16 and the device slot. When this bit is set, the second processing set 16 can always be master of the device slot or bus 22, while the ability of the device slot itself to be master depends on whether bit SRR[3] is set. Bit SRR[3] is an arbitration bit which gives the device slot the ability to become master of the device bus 22, but only if it is owned by one of the processing sets 14 and 16, that is if either the SRR[1] or SRR[2] bit is set.

When the fake bit (SRR[0]) of an SRR 118 is set, writes to the device for that slot are ignored and do not appear on the device bus 22. Reads return indeterminate data without causing a transaction on the device bus 22. In the event of an I/O error, the fake bit SRR[0] of the SRR 118 corresponding to the device that caused the error is set by the hardware configuration of the bridge in order to disable further access to the device slot concerned. An interrupt may also be generated by the bridge to inform the software that originated the access leading to the I/O error that the error has occurred. The fake bit has effect irrespective of whether the system is in the split or the combined mode of operation. In contrast, the ownership bits only have effect in the split system mode of operation.

As mentioned above, in split mode each slot can be in one of three states: not-owned; owned by processing set 14; or owned by processing set 16 (for a two processing set system). The particular state is determined by the two middle SRR bits, namely SRR[1] and SRR[2]. Thus SRR[1] is set when the slot is owned by processing set 14, and SRR[2] is set when the slot is owned by processing set B. If the slot is unowned, then neither bit is set. (Having both bits set is an illegal condition and is prevented by hardware, although ownership of a device by some, but not all, of the processing sets may perhaps be permitted in other embodiments). Note that the owned bits can be altered in the combined mode of operation state, but they have no effect until the split mode is entered. When a processing set is powered off, all slots owned by it move to the unowned state.

Returning to FIG. 4, the address decode logic 142 is configured to verify the correctness of any DMA address supplied by a device 30. In one embodiment of the invention, this is achieved by comparing four significant address bits of the address supplied by the device 30 with the corresponding four address bits of the address held in a geographic addressing map (not shown in FIG. 4) for the slot identified by the D bus grant signal for the DMA request.

In one embodiment, four address bits are sufficient to determine whether the address supplied is within the correct address range. Thus typically 32-bit PCI bus addresses are used, with bits 31 and 30 always being set to 1, bit 29 being allocated to identify which of two bridges on a motherboard is being addressed (for a system having a redundant pair of bridges), and bits 28 to 26 identifying a PCI device. Bits 25–0 define an offset from the base address for the address range for each slot. Accordingly, by comparing bits 29–26, it is possible to identify whether the address(es) supplied fall(s) within the appropriate address range for the slot concerned. It will be appreciated that in other embodiments a different number of bits may be compared to make this determination, depending upon the particular allocation of the addresses.

When the system is in split mode, a DMA request is directed to the processing set 14 or 16 that owns the slot concerned. If the slot is currently unowned, then the bridge does not respond to the DMA request. In split mode, the address decode logic 142 is operable to determine the ownership of the device originating the DMA request by accessing the SRR 118 for the slot concerned. The appropriate slot can be identified by the D bus grant signal. The address decode logic 142 is then operable to control the target controller 140 to pass the DMA request to the appropriate processing set(s) 14/16 based on the ownership bits SRR[1] and SRR[2]. If bit SRR[1] is set, the first processing set 14 is the owner and the DMA request is passed to the first processing set. If bit SRR[2] is set, the second processing set 16 is the owner and the DMA request is passed to the second processing set. If neither of the bits SRR[1] and SRR[2] is set, then the DMA request is ignored by the address decoder, and is not passed to either of the processing sets 14 and 16.

Figure 7:
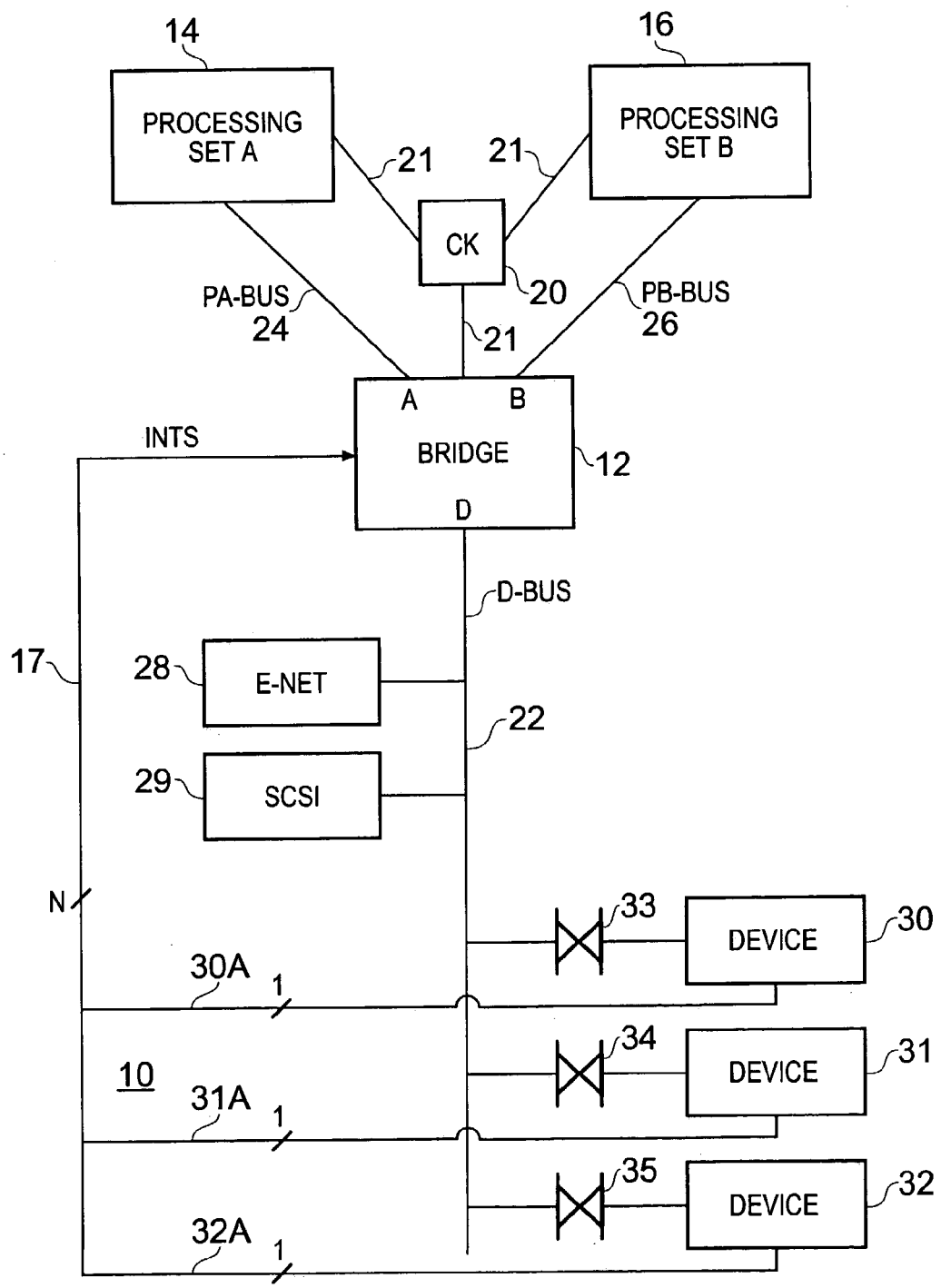
FIG. 7 depicts an enhancement of the fault tolerant computer system of FIG. 1 in respect of interrupt communications.

FIG. 7 illustrates an enhancement to the system of FIG. 1, whereby interrupts from the various devices 30, 31, 32 attached to the D-bus 22 are transmitted to the processing sets via the bridge 12. In split mode, the bridge has the task of routing each received interrupt to the processing set owning the device from which the interrupt originated, while in combined mode all interrupts are routed to all processors.

As shown in FIG. 7, a single interrupt line is provided from each device through to the bridge 12. Thus a line 30A of one bit originates from device 30, line 31A of one bit originates from device 31, and line 32A originates from device 32, again of one bit. These lines are then joined into a bus 17 that leads to bridge 12. Bus 17 has n-bits, where n is equal to or greater than the number of individual devices attached or attachable to the D-bus 22. Accordingly, bus 17 provides a separate line to carry the interrupt signal from each separate device 30, 31, 32 to the bridge 12. Note that interrupt lines 30A, 31A, 32A and bus 17 may be integrated into the D-bus, or alternatively provided on a dedicated bus or other appropriate form of communications link. (If the D-bus is a PCI compliant bus, then it would not generally be used to carry interrupts).

Figure 8:
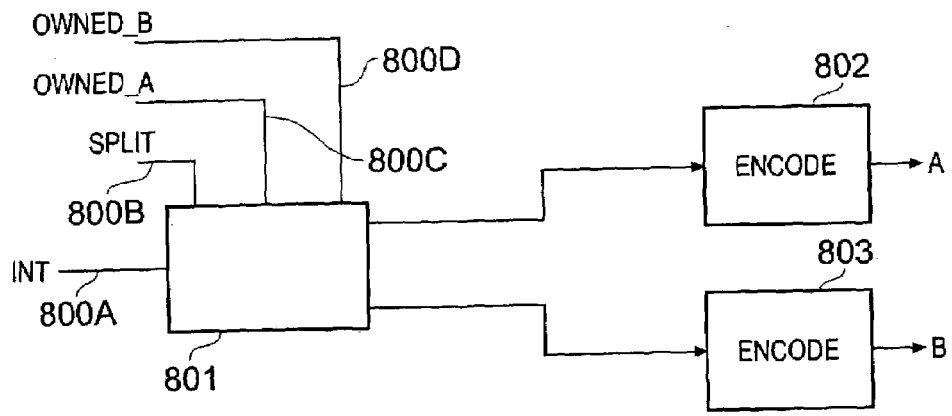
FIG. 8 is a schematic block diagram of interrupt processing within the bridge for the system of FIG. 7.

FIG. 8 illustrates the logic included within bridge 12 in order to direct an incoming interrupt to the correct (owning) processing set. In the embodiment shown, it is assumed that there are only two processing sets, A and B, but the skilled person will readily be able to extend the approach illustrated to cope with more than two processing sets.

As shown in FIG. 8, the interrupt processing logic 801 in bridge 12 receives four input signals. The first of these is the set of n separate interrupt signals 800A received over the bus 17, one such interrupt signal being provided for each device attached to the D-bus 22. The second input represents a line 800B that indicates whether or not the system is currently in split mode. Typically this line is arranged to go high if the system is in split mode and low if it is not, and can be driven by information stored in the control state and e-state registers 114, see FIG. 3. (The skilled person will of course appreciate that in other embodiments, the polarity of this and/or any other relevant component may be reversed—for example, having a low signal to represent split mode and/or an interrupt. Appropriate modifications would then be made to the disclosed logic to accommodate these signal changes).

The remaining two inputs into control logic 801 are lines 800C and 800D that go high to indicate that a particular device is owned by processing set A or by processing set B respectively. This information can be derived from the slot response registers 118 of FIG. 3, more particularly from SRR[1] and SRR[2] as shown in FIG. 6.

It will be appreciated that the system maintains ownership information for each different device slot attached to bus 22. This gives rise to two main possible configurations. Firstly, there may be just a single logic unit 801 handling all devices (slots) attached to bus 22. Alternatively, logic 801 can be replicated for each device. In this case the interrupt signals entering the bridge along bus 17 are individually routed to the particular instance of the device logic that is attached to the SRR for that device. (Of course, it is also possible to have some form of intermediate arrangement, where there are multiple sets of logic 801, each handling some but not all of the devices)

The output of logic 801 goes (in split mode) to one of two encode units: a first encode unit 802 that directs interrupt signals to processing unit A, and a second encode unit 803 that directs interrupt signals to processing unit B. The encode units 802, 803 transmit 6-bit vectors to their respective processing unit that identify the particular device currently raising an interrupt. If there are no current interrupts then an idle code is transmitted. Hence this embodiment supports up to 63 different interrupt devices (64 possibilities from a 6-bit code, with one 6-bit code representing the idle vector). Note that the interrupt signals from the bridge 12 to the processing sets 14, 16 can either be transmitted over the PA/PB buses 14, 16, or alternatively a separate connection (not shown in FIG. 7) can be provided for this task, depending on the particular requirements of any given embodiment.

It will be appreciated that in order to generate this interrupt vector, the encoding units 802, 803 first determine the originating device of a given interrupt signal. The manner in which this is done will depend on the particular configuration adopted. For example, as previously mentioned, logic 801 may be replicated for each device, in which case the determination is made simply on the basis of which particular logic unit is transmitting the interrupt signal to the relevant encode unit. Alternatively, if there is only a single logic block 801 for all device slots, then logic 801 can directly indicate to the relevant encode unit which device unit originated the interrupt signal (based on the particular line within bus 17 that signalled the interrupt).

Figure 9:
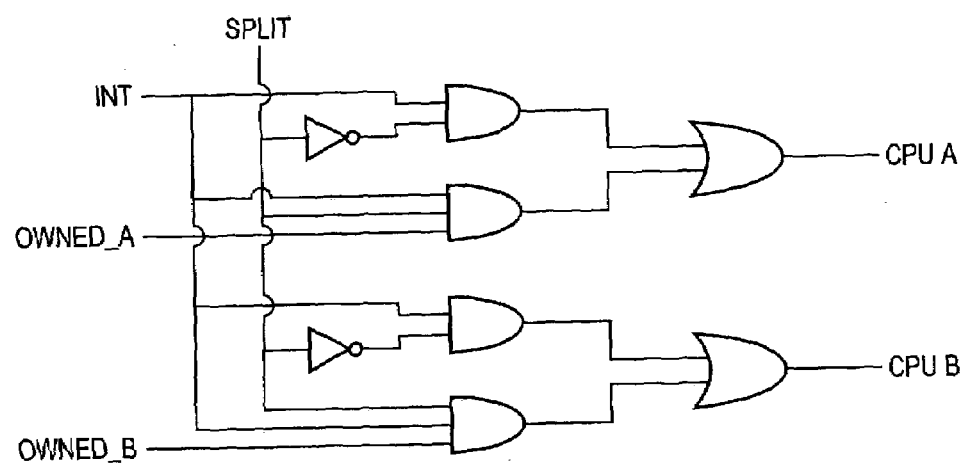
FIG. 9 depicts one possible implementation of the interrupt processing circuitry shown in FIG. 8.

FIG. 9 illustrates one potential implementation of the logic 801 of FIG. 8, although the skilled person will be aware that there are many equivalent logical configurations. It is assumed here that we are dealing with interrupts from only one particular device attached to the D-bus 22. In other words, we have a single bit on the interrupt line (shown as int) and a single bit from each of the slot response registers (shown as owned_A and owned_B, depending on ownership), that are all particular to this device. Of course, the logic shown in FIG. 9 may then be repeated multiple times within a single unit 801, if one such unit is to handle interrupts from all devices.

The logic illustrated in FIG. 9 implements the following Boolean expression:

CPU_$A$=(int.!split)+(int.split.owned_$A$)

CPU_$B$=(int.!split)+(int.split.owned_$B$)

(where "!" equals NOT, "." equals AND, and "+" equals OR, the well-known Boolean operators).

It will be appreciated that the effect of this logic is that if the split signal is not set, in other words the system is currently in a combined mode, then any incoming interrupt will be forwarded to both processing sets, irrespective of the current ownership status of the originating device. This is appropriate for fault tolerant operation, in order to ensure that processing set A and processing set B do remain properly in lock step with one another.

On the other hand, if the split signal is set (i.e., high) to indicate that the system is currently in split mode, then the incoming interrupt will be directed to only processing set A or to processing set B, depending on whether the owned_A signal or the owned_B signal is asserted. (As previously mentioned, having owned_B and owned_A both set simultaneously set is a disallowed state, and is prevented by hardware).

Consequently, if the owned_A signal is positive, then the incoming interrupt signal is forwarded by the bridge to processing set A, but not to processing set B. Conversely, if the owned_B signal is positive, then the incoming interrupt is propagated to processing set B, but not to processing set A.

In this manner, incoming interrupt signals in split mode are directed only to the CPU that owns the device from which the interrupt signal originated. The other CPU should have no particular interest in that device (since it does not own it), and accordingly does not receive the interrupts. Hence, the performance of a processing set is not impaired by the receipt of (in effect) spurious and irrelevant interrupt signals from devices that that processing set does not own, and hence that are of no interest to it.

The skilled person will recognise that there any many possible variations on the embodiments illustrated in FIGS. 7–9. For example, in these embodiments there is only a single bit interrupt signal from each device. However, it is well-known to provide interrupt signals comprising multiple bits, which can then be used to specify interrupts having different priority levels, and/or different forms of interrupt (such as arising from a particular component within a device, or from a particular fault circumstance). Indeed, the PCI specification itself formally defines a four-bit interrupt signal (this is to be carried out of band, rather than over the PCI bus itself).

Substantially the same approach as described above can also be used for routing such a multi-bit interrupt to the appropriate processing set, except that the logic of FIG. 9 typically has to be replicated for each bit of the interrupt signal. Of course, the encode units 802 and 803 from FIG. 8 may also need modification in this case, for example by expanding the six-bit vector to accommodate the increased interrupt information.

It will also be appreciated that while the embodiments of FIGS. 7–9 are based on a hardware (bus) implemented interrupt transmission scheme (the presence of absence of an interrupt is directly communicated by the voltage level on a connecting wire), it is also possible to transmit interrupts using a software-implemented link (such as provided by the forthcoming Infiniband standard). In one example of this latter approach, information about interrupt status, which may comprise one bit or multiple bits, is packetised for transmission from one component to another, for example from device 30, 31, or 32 to bridge 12. With this approach, the bridge examines the packet to identify the originating device, determines the processing set that currently owns the device, and then forwards the packet to the determined processing set. It will be appreciated that such processing can be performed either by a software packet processing facility, or by special-purpose hardware within the bridge (or a combination thereof).

Figure 10:
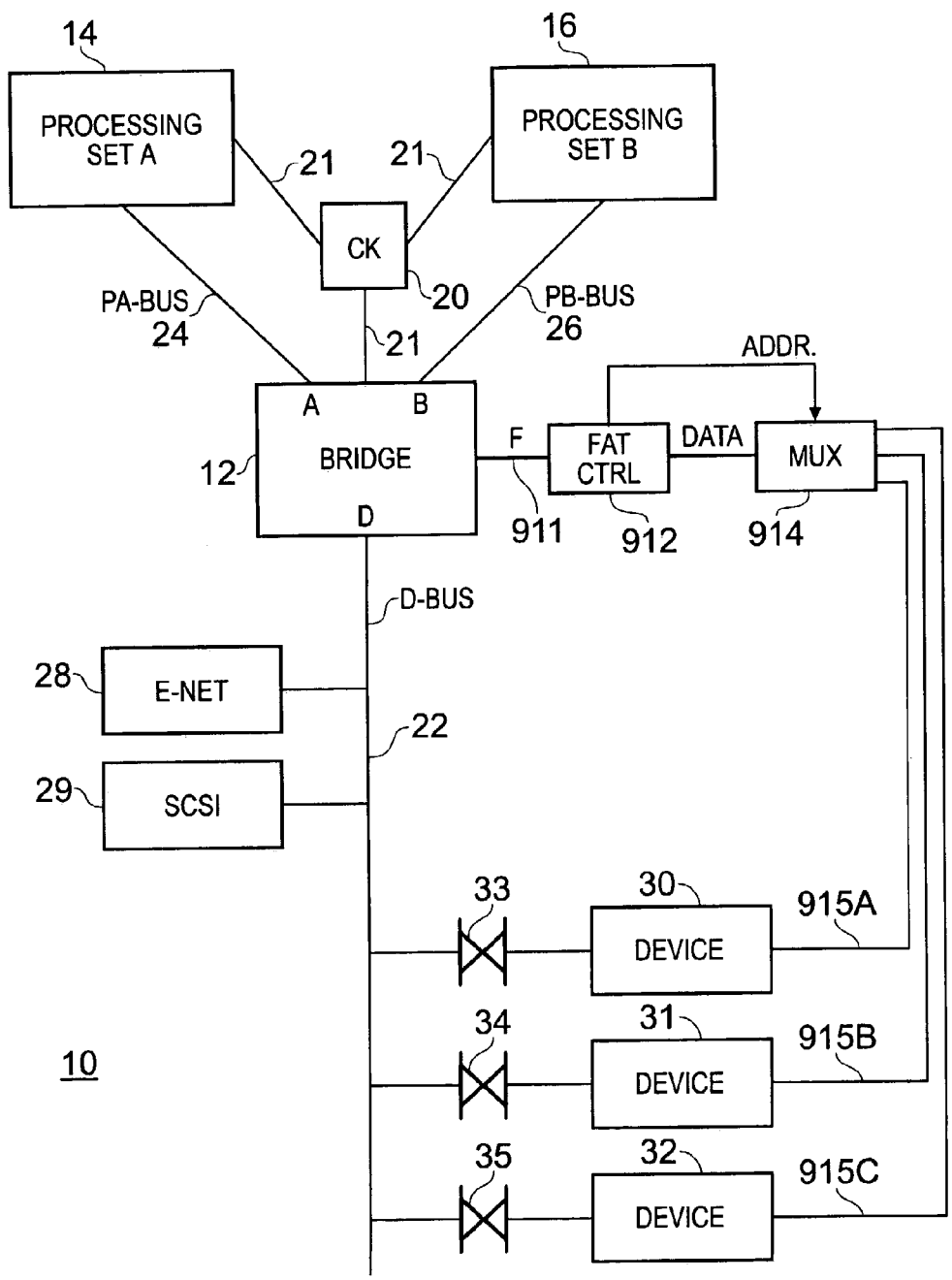
FIG. 10 depicts the fault tolerant computer system of FIG. 1 provided with an additional bus for maintenance commands.

FIG. 10 illustrates a mechanism used in conjunction with the fault tolerant system of FIG. 1, whereby maintenance control signals can be directed to the various devices 30, 31, 32 attached to the D-bus 22. These signals can be used to perform operations such as adjusting fan speeds, or controlling power supplies. The maintenance commands from processing set A and processing set B are routed via the bridge 12 over a bus, known as the F-bus 911, to a controller 912 (known as the FAT controller). The FAT controller 912 is then responsible for generating a data output and an address output that are both supplied (separately) to a multiplexer 914.

Note that in one embodiment, the F-bus corresponds to bus 128 shown in FIG. 3 (in other words the posted write buffer 122 and dirty RAM 124 are also in effect attached to the F-bus). Thus one can regard the FAT controller 912 (and also the multiplexer 914) as formally part of the bridge 12, although in FIG. 10 they are shown separately for convenience.

The multiplexer 914 is connected by individual links to each of the devices attached to the D-bus 22. These links are shown in FIG. 10 as bus 915A, bus 915B, and bus 915C (and so on for any additional devices not shown in FIG. 10).

Collectively these are referred to as the maintenance bus. It will be appreciated that the purpose of the multiplexer 914 is to direct data transmitted from the FAT controller 912 over a particular bus 915A, 915B, 915C in accordance with the address signal supplied to the multiplexer from the FAT controller.

In one embodiment, there are up to sixteen devices that may be attached to the D-bus 22, and accordingly the address signal supplied to the multiplexer 914 comprises four bits. This address specifies which of the (potentially) sixteen buses, 915A, 915B, 915C, and so on the multiplexer uses to transmit and receive data. Once the multiplexer 914 has been set by the address signal, the FAT controller 912 basically sees a single bus transparently through the multiplexer to the specified device.

Figure 11:
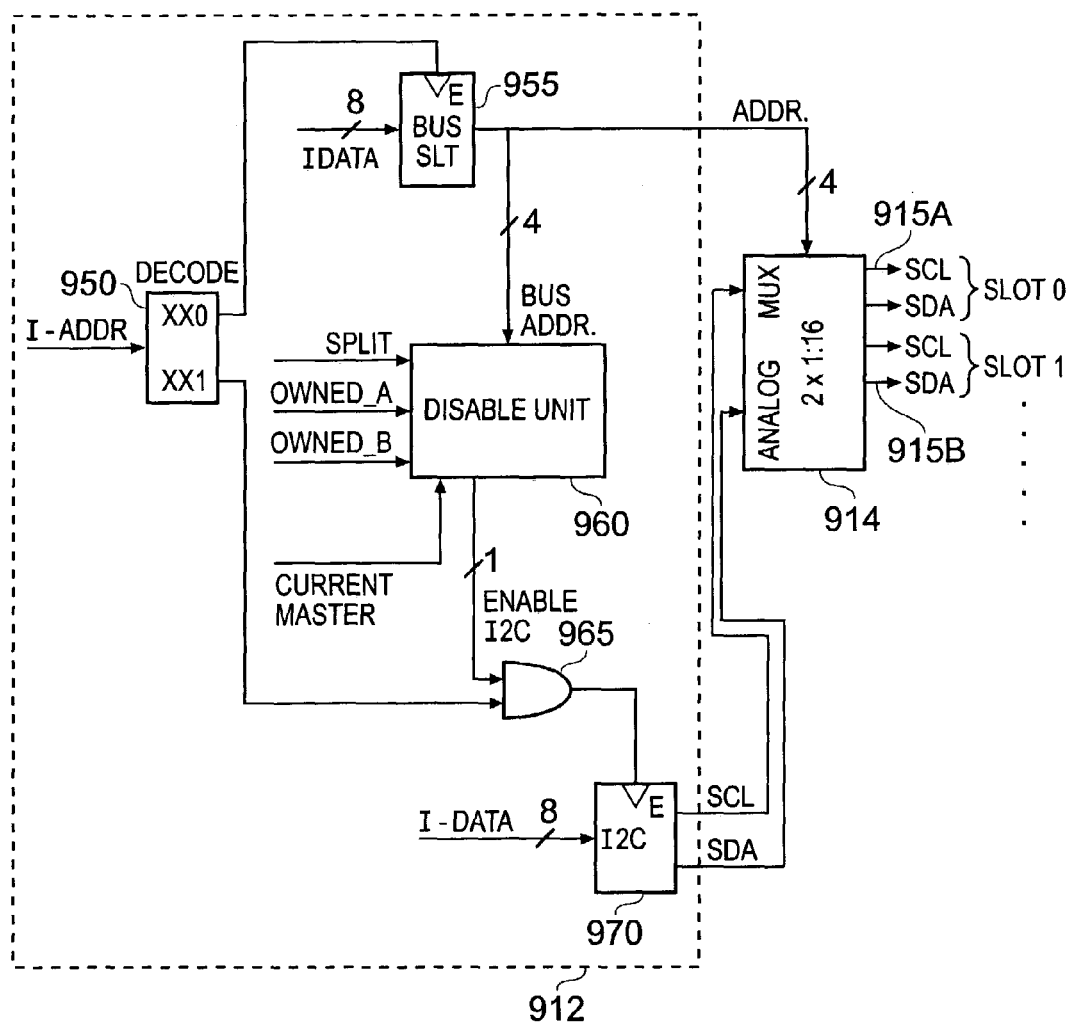
FIG. 11 depicts a particular embodiment of the FAT controller in accordance with the present invention for use in the system of FIG. 10.

FIG. 11 illustrates the configuration of the FAT controller 912 and multiplexer 914 in more detail for one embodiment of the invention, whereby commands are prevented from being sent to a device that is not owned by the processing set that generated the command. (Note that known implementations of the fault tolerant system based on the '477 patent include support for maintenance bus operations such as shown generally in FIG. 10. However, the FAT controller in these known implementations does not provide the above safeguard, so that a processing set can successfully send commands to any device, even those that it does not own).

In the embodiment illustrated in FIG. 11, communications over the maintenance bus are performed using the I2C interface. This is an industry standard protocol, originally developed by Phillips, which is based on a two-wire serial connection. One of these wires, known by convention as SCL, is used to provide a clock signal, while the other wire, known by convention as SDA, is used to provide the data signal. Note that a particular aspect of I2C is that an address may be transmitted as the first byte of data over the SDA line. A particular clocking sequence is provided to indicate that an address is indeed being transmitted in this manner.

In the embodiment of FIG. 11, processing sets A and B output data via the bridge 12 onto the maintenance bus by writing to a predetermined address, or more specifically, to one of a pair of contiguous addresses. The last (least significant) bit of this pair of addresses varies according to the nature of data that is directed to the specified address. Thus if the last bit is a 0, this is taken as an indication that the accompanying instruction data (I-data) identifies a particular device attached to the D-bus 22, to which the following output is to be directed. The FAT controller 912 therefore needs to set the multiplexer 914 accordingly, so that the correct device is selected (together with the associated slot and bus 915A/B/C). Alternatively, if the last bit of the instruction address from the processing set is a 1, then the accompanying I-data represents real data to be transmitted over the I2C link. This data is then directed to a particular device in accordance with the current setting of the multiplexer.

Accordingly, the instruction address and data are received from the bridge over the F-bus into the FAT controller 912. The instruction address is then passed to a decode unit 950. If the supplied address ends in a 0, then the decode unit 950 outputs an enable signal to the bus select unit 955. This bus select unit 955 also receives the instruction data from the processing set via the F-bus, and an appropriate internal connection (not shown) within the FAT controller 912. Thus when the bus select unit 955 is enabled by the decode unit 950, an address output signal is generated from the instruction data, and this (4-bit) address output signal is fed to the multiplexer 914. Consequently, the multiplexer is set to direct communications to the selected device. (It will be appreciated that the I-data fed into the bus select unit 955 may directly define the address output signal to specify the desired device, or at least will allow it to be generated in a straightforward manner).

In one embodiment, supporting up to 16 devices attached to the D-bus, the multiplexer 914 is a 2×1:16 multiplexer—in other words it provides 16 two-wire outputs. Each output is directed to a respective slot or device via the corresponding bus. For example, slot 0 connects to bus 915A, slot 1 connects to bus 915B, and so on (see also FIG. 10). The I2C data to be transmitted to these slots/devices is generated by I2C port 970 in accordance with the instruction data received from the processing sets. This instruction data is received via the bridge, the F-bus, and a suitable internal connection (not shown) within the FAT controller. The particular sequence of instruction data generated by the processing sets is such as to drive the I2C port 970 in conformity with the I2C standard. (It will be appreciated that the generation and transmission of such I2C commands per se is well-known in the art, and accordingly the details will not be described herein).

An enable signal is supplied to I2C port 970 from a two-input AND gate 965. I2C port 970 is only operative to transmit data to devices 30, 31, 32 if this enable signal is set (positive); otherwise I2C output is disabled, and so no data is transmitted over the maintenance bus, irrespective of the incoming instruction data.

A first input into the AND gate 965 comes from the decode unit 950. The decode unit 950 only transmits a positive signal to AND gate 965 if the instruction address ends in a 1. If, on the other hand, the instruction address does not end in a 1, then the instruction data being supplied does not represent actual data for transmission over the I2C link, hence the disablement of I2C port 970. This is because in this situation the instruction data from the processing unit is selecting a device attached to D-bus 22 to which future communications should be directed (as described above).

A second input for the AND gate 965 is from disable unit 960, which serves to ensure that a processing unit only writes to a device that it owns. Thus if a processing unit tries instead to write to a device that it does not own, then the disable unit 960 does not generate the appropriate enablement signal. Consequently AND gate 965 does not provide an enable signal to I2C port 970, and accordingly, no communications or commands can be sent to the impermissibly selected device.

As illustrated in FIG. 11, the disable unit 960 receives several inputs from which to generate the enable signal. A first input is from the bus select unit 955, and indicates the current output device that has been specified to the multiplexer 914—in other words the device number to which any output from the I2C port 970 will be directed.

The disable unit 960 further receives a split signal, which is high when the system is operating in split mode. As previously mentioned, the split signal is typically stored in the control state registers 114 (see FIG. 3).

The disable unit 960 also receives an owned_A and owned_B signal, or more accurately, a set of these signals, one for each device. The owned_A signal is positive when the device concerned is owned by processing unit A, while the owned_B signal is positive when this device is owned by processing unit B instead. As previously described, the owned_A and owned_B signals can be generated from the slot response registers 118 (see FIG. 6); more especially, the owned_A signal corresponds to SRR[1], and the owned_A signal corresponds to the SRR[2].

Lastly, the disable unit 960 receives a signal indicating which of the processing sets is the current master, in other words which of the processing sets is responsible for originating the instruction address and instruction data now being processed. If there are only two processing sets, A and B, then the current master signal can be supplied simply as a binary signal, to represent processing set A in one state and to represent processing set B in the other state. More generally, a single bit could be provided for each processing set to indicate whether or not that processing set is the current master. Note that only one of these bits could be set at any given time. (It will be appreciated that this approach is analogous to the owned_A and owned_B signals). Again, the current master information is typically stored in the control state registers 114 (see FIG. 3).

Note that the control state registers, containing the split mode and current master data, plus the slot response signals, containing the device ownership data, are both located on the bridge 12, and so must be passed to the FAT controller 912. This can either be achieved over the F-bus 911, or some other suitable data connection can be provided. A further possibility is that the FAT controller 912 (and optionally the multiplexer 914) can be formed as an internal component of the bridge 12, in order to facilitate assist this data transfer.

The logic implemented in the disabled unit 960 in one embodiment is as follows:

Enable_I2C(k)=!split+(split.((master_A.owned_A
    (k))+(master_B.owned_B(k)).(bus_sel=k))

Enable_I2C=Enable_I2C(0)+Enable_I2C(1)+. . .
    Enable_I2C(15)

The first line of the above logic corresponds to just a single device attached to the D-bus 22. The first term tests whether or not the system is currently in split mode. As previously described, device ownership is only enforced in split mode, when it is assumed that the processing sets are operating independently from one another. Therefore, if the split signal is negative (not in split mode), the disable unit 960 always supplies an enable signal to I2C port 970, thereby allowing communications to proceed with the selected device.

On the other hand, if the system is in split mode, then the second term of the first line ensures that communications are only enabled if the processing unit that is current master (indicated by master_A or master_B being set high as appropriate) also owns the currently selected device, to which the communications are being directed. More particularly, this determination is performed separately for each device, in other words testing the master_A signal against the owned_A signal for that particular device, and likewise for processing set B. Thus with a 4-bit address, this logic is repeated 16 times, for k=0–15.

The second line of the logic then represents the combined results of the determination for each of the devices. Note however that only one of these elements can be positive at any given time, given the bus_sel=k term. In other words, only the logic corresponding to the currently selected bus (i.e. device) can provide a positive input to the enable signal; the remaining terms in the second line must all be zero, since they do not relate to the currently selected device.

It will be seen that the overall effect of the disable unit 960 is to prevent a processing set from communicating over the maintenance bus with a device that it does not own. As a result therefore, access by a processing set to a given device is appropriately regulated, so that a processing set can only access over the maintenance bus a device that it owns. Consequently one processing set cannot interfere with the operation of another processing set, by interacting with a device owned by the other (or another) processing set. This therefore ensures that in split mode there is full independence as desired between the processing sets.

Note that the above restriction regarding device ownership is only enforced when the system is in split mode, because it is in this state that the processing sets have to operate independently from one another. No such restriction is applied when the system is not in split mode (in other words when it is operating in combined or fault tolerant mode), since here the processing sets are operating in lockstep with one another, and can therefore be considered as sharing ownership of all the devices.

Although the above approach for conforming maintenance bus operations to device ownership has been described in relation to an I2C link, it will be appreciated that other serial links could also be used instead, such as Universal Serial Bus (USB) or Infiniband. Note that the latter link is packet-based, in which case the disable unit needs to be provided with appropriate hardware and/or software to determine the relevant sender and target information for each packet. In addition, although FIGS. 10 and 11 illustrate the presence of just two processing units, the skilled person will recognise that the logic given above scales directly to support three or more processing sets.

It will further be recognised that many of the different components illustrated in FIGS. 10–11 may be altered, combined, or replaced without impacting the overall nature of operations. For example, the FAT Controller 912 may be embedded into the bridge 12, potentially along with the multiplexer 914, or the multiplexer could be replaced by some form of switching unit. In addition, some forms of connection, such as USB, support the simultaneous attachment of multiple devices, in which case the multiplexer could be substituted by a hub or similar device.

In conclusion therefore, while a variety of particular embodiments have been described in detail herein, it will be appreciated that this is by way of exemplification only. Thus the skilled person will be aware of many further potential modifications and adaptations that fall within the scope of the claimed invention and its equivalents.

The invention claimed is:

1. A method of operating a computing system comprising two or more processing sets, each including a connection to at least one device, said method comprising:
    allocating ownership of the device to one of said two or more processing sets;
    wherein said computing system is operable in at least two different modes, including a first combined mode in which all of said two or more processing sets operate in lockstep with one another, and a second split mode in which said two or more processing sets operate independently of one another;
    wherein during operation in the split mode, transmitting one or more interrupts generated by the device only to the processing set to which ownership of the device has been allocated; and
    wherein during operation in the combined mode, transmitting additional interrupts generated by the device to each of the processing sets.

2. The method of claim 1, further comprising providing a bridge within the computing system intermediate said two or more processing sets and said device, wherein said interrupt is transmitted via the bridge.

3. The method of claim 2, wherein said transmitting said interrupt from the device to the processing set to which ownership of the device has been allocated comprises sending the interrupt from the device to the bridge, and forwarding the interrupt from the bridge to the processing set to which ownership of the device has been allocated.

4. The method of claim 3, further comprising maintaining information at the bridge specifying ownership of the device by a processing set.

5. The method of claim 4, wherein said forwarding the interrupt is performed in accordance with the information maintained at the bridge specifying ownership of the device by a processing set.

6. A computing system comprising:
two or more processing sets;
at least one device including a connection to each of said two or more processing sets, wherein ownership of the device is allocated to one of said two or more processing sets; and
a control facility associated with said connection configured to transmit interrupts
wherein said computing system is operable in at least two different modes, including a first combined mode in which all of said two or more processing sets operate in lockstep with one another, and a second split mode in which said two or more processing sets operate independently of one another;
wherein during operation in the split mode, the control facility is configured to transmit one or more interrupts generated by the device only to the processing set to which ownership of the device has been allocated; and
wherein during operation in the combined mode, the control facility is configured to transmit additional interrupts generated by the device to each of the processing sets.

7. The computing system of claim 6, wherein said control facility comprises a bridge located intermediate said two or more processing sets and said at least one device, wherein said interrupt is transmitted over the connection from the device to the processing set to which ownership of the device has been allocated via the bridge.

8. The computing system of claim 7, wherein the bridge includes memory for storing information specifying ownership of the device by a processing set.

9. The computing system of claim 8, wherein an interrupt received at the bridge from a device is steered to the processing set to which ownership of the device has been allocated in accordance with said stored information.

10. A method of operating a computing system comprising two or more processing sets each including a serial connection to at least one device, said method comprising:
allocating ownership of the device to one of said two or more processing sets;
generating a command for transmission to the device by a processing set;
wherein said computing system is operable in at least two different modes; including a first combined mode in which all of said two or more processing sets operate in lockstep with one another, and a second split mode in which said two or more processing sets operate independently of one another;
wherein during operation in the split mode, disabling transmission of said command to the device over said serial connection if the processing set that generated the command has not been allocated ownership of the device; and
wherein during operation in the combined mode, transmitting said command to the device over said serial connection.

11. The method of claim 10, further comprising providing a bridge within the computing system intermediate said two or more processing sets and said device, wherein said command is transmitted via the bridge.

12. The method of claim 11, wherein a command generated by a processing set is transmitted to said bridge for forwarding to the device over said serial connection, and wherein said forwarding is disabled if the processing set that generated the command has not been allocated ownership of the device.

13. The method of claim 12, further comprising maintaining information at the bridge specifying ownership of the device by a processing set.

14. The method of claim 13, wherein said disabling is performed in accordance with the information maintained at the bridge specifying ownership of the device by a processing set.

15. The method of claim 14, wherein said disabling transmission of the command to a device comprises:
comparing the information maintained at the bridge specifying ownership of the device with information specifying the processing set that transmitted the command to the bridge; and
enabling the forwarding of the command from the bridge to the device only if said comparison reveals a match.

16. A computing system comprising:
two or more processing sets;
at least one device including a serial connection to each of said two or more processing sets for receiving commands therefrom, wherein ownership of the device is allocated to one of said two or more processing sets; and
a control facility associated with said serial connection for controlling transmission of a command to the device;
wherein said computing system is operable in at least two different modes, including a first combined mode in which all of said two or more processing sets operate in lockstep with one another, and a second split mode in which said two or more processing sets operate independently of one another;
wherein during operation in the split mode, the control facility is configured to disable transmission of said command to the device over said serial connection if the processing set that generated the command has not been allocated ownership of the device; and
wherein during operation in the combined mode, the control facility is configured to transmit said command to the device over said serial connection.

17. The computing system of claim 16, wherein said control facility comprises a bridge located intermediate said two or more processing sets and said at least one device, wherein a command is transmitted from a processing set to the bridge for forwarding to a device via the bridge over said serial connection.

18. The computer system of claim 17, wherein the forwarding of a command from said bridge over said serial connection to the device is disabled if the processing set that generated the command has not been allocated ownership of the device.

19. The computer system of claim 18, wherein the bridge includes memory for storing information specifying ownership of the device by a processing set.

20. The computer system of claim 14, further comprising a disablement unit which includes logic for comparing the information stored at the bridge specifying ownership of the device with information specifying the processing set that transmitted the command to the bridge.

21. The computer system of claim 20, wherein said logic is responsive to said comparison detecting a match to output an enablement signal allowing forwarding of the command from the bridge to the device.

22. The computer system of claim 21, wherein said bridge includes a multiplexer, each output of which is attached to a serial connection to respective devices, and a controller responsive to an address received in a command from a processing set for selecting the multiplexer output accordingly.

23. The computer system of claim 22, wherein said disablement unit is responsive to said address received in a command from a processing set in performing said comparison.

24. The computer system of claim 16, wherein said serial connection is an I2C link.

25. The computer system of claim 16, wherein said serial connection is a USB link.

26. The computer system of claim 16, wherein said serial connection is used for transmitting maintenance commands between the two or more processing sets and the at least one device.

27. The computer system of claim 26, further comprising a separate bus connection between the two or more processing sets and the at least one device for transmitting commands other than maintenance commands.

28. The computer system of claim 27, wherein said control facility is also associated with said separate bus connection.

* * * * *